(12) United States Patent
Kim et al.

(10) Patent No.: US 7,428,272 B2
(45) Date of Patent: Sep. 23, 2008

(54) METHOD AND APPARATUS FOR JOINT PHASE OFFSET AND FREQUENCY OFFSET ESTIMATOR FOR MPSK TRANSMISSION

(75) Inventors: Ki Seon Kim, Kwangju (KR); Seung Geun Kim, Seoul (KR)

(73) Assignee: Kwangju Institute of Science and Technology, Kwangju (KR)

( * ) Notice: Subject to any disclaimer, the term of this patent is extended or adjusted under 35 U.S.C. 154(b) by 646 days.

(21) Appl. No.: 10/403,397

(22) Filed: Apr. 2, 2003

(65) Prior Publication Data
US 2004/0066862 A1    Apr. 8, 2004

(30) Foreign Application Priority Data
Oct. 7, 2002    (KR)    ........................ 10-2002-0061110

(51) Int. Cl.
*H04L 27/22*    (2006.01)
(52) U.S. Cl. .................................... 375/329
(58) Field of Classification Search ............ 375/316, 375/322, 329
See application file for complete search history.

(56) References Cited

U.S. PATENT DOCUMENTS

| 6,353,642 | B1 * | 3/2002 | Asahara et al. | ............... 375/344 |
| 6,373,827 | B1 * | 4/2002 | Tayebi et al. | ................. 370/310 |
| 6,421,399 | B1 * | 7/2002 | Avidor et al. | ............... 375/329 |

* cited by examiner

*Primary Examiner*—Kevin M Burd
(74) *Attorney, Agent, or Firm*—Frommer Lawrence & Haug LLP; Ronald R. Santucci

(57) ABSTRACT

Disclosed are a method and an apparatus for joint phase and frequency offset estimator for an MPSK transmission, in which the overall observation interval is divided into adjacent sub-intervals and a folded separate phase estimate is independently obtained from each of sub-intervals and is then unfolded to remove the discontinuity in computing phase estimate. The phase offset is then computed by averaging the unfolded phase estimates whereas the frequency offset is computed by averaging the differences between adjacent unfolded phase estimates.

10 Claims, 5 Drawing Sheets

(a) OBSERVING INTERVAL FOR CONVENTIONAL PHASE OFFSET ESTIMATION (b) OBSERVING INTERVAL FOR PHASE OFFSET ESTIMATION ACCORDING TO THE PRESENT INVENTION

METHOD AND APPARATUS FOR JOINT PHASE OFFSET AND FREQUENCY OFFSET ESTIMATOR FOR MPSK TRANSMISSION

BACKGROUND OF THE INVENTION

1. Field of the Invention

The present invention relates to a method and an apparatus for joint phase and frequency offset estimator for a multiple phase shift keying (referred to as "MPSK" hereinafter) transmission, which is capable of generating a smaller delay in comparison with a conventional method sequentially estimating the phase and frequency offsets by simultaneously performing phase and frequency offset estimations using phase estimates computed from the samples within each sliced observation interval, and which is capable of reducing a complexity by sharing a plurality of hardware parts.

2. Description of the Prior Art

In recent years, a synchronization technique is variously required in transmitting and receiving signal processes of a digital communication. The synchronization techniques can be classified into a burst synchronization and a continuous synchronization. Many modern digital communication systems utilize a burst mode transmission in which a relatively small number of information bits are transmitted by sending a sequence of a small number of waveforms. In a general burst packet transmission, the transmitting data are divided into packets, a short preamble symbol sequence is attached at the beginning of each packet, and then a receiver demodulates the received symbols with an achievement of a synchronization by using the short preamble.

Data are transmitted using a burst mode in a time division duplex (referred to as "TDD" hereinafter) mode transmission of a fixed broadband wireless access (referred to as "BWA" hereinafter) system. Since the fixed BWA system utilizes a coherence communication, it should compensate for a phase offset and a frequency offset. The phase offset is caused by disparity in the reference phases of a remote transmitter and a local receiver. The frequency offset is caused by disparity in the frequencies of the remote transmitter and the local receiver. Accordingly, the frequency offset and the phase offset should be necessarily compensated. In the burst mode communication, a short preamble is appended in front of a starting part of each burst transmission and the burst having the short preamble is transmitted. In order to obtain a frequency offset and a phase offset, a feed-forward synchronous method is generally used.

In a typical system, the phase offset and the frequency offset are independently estimated. Namely, two exclusive hardwares causing a structural complexity are used to estimate the phase offset and a frequency offset, i.e., a maximum likelihood phase estimator is used to estimate the phase offset estimation and a data-aided frequency offset estimator is used to estimate the frequency,offset estimation. Since a phase offset estimation starts after a compensation of a frequency offset, a latency is increased in a demodulator.

Conventional apparatus and method for estimating a frequency and a phase calculates phases on every received symbols, and then estimates a phase offset and a frequency offset by using the calculated phases. To obtain a phase offset, the calculated phases are summed up, and the sum of the calculated phases is divided by a predetermined value. To obtain a frequency offset estimate, a total N symbol observing interval are divided into three even length intervals. The phases of the first observing interval are multiplied by a negative constant, the phases of the second are multiplied by zero, and the phases of the third are multiplied by a positive constant having the same amount as the negative constant in first symbol observing interval. The resultant values of the multiplications in the first, second, and third intervals are summed up and the result is divided by a predetermined value, thereby estimating a frequency offset.

SUMMARY OF THE INVENTION

The present invention is contrived to solve the foregoing problems. It is an object of the present invention to provide a method and an apparatus for joint phase and frequency offset estimator for an MPSK transmission, where the overall observation interval is divided into adjacent sub-intervals and a folded separate phase estimate is independently obtained from each of sub-intervals and then is unfolded to remove the discontinuity in computing phase estimate. The phase offset is then computed by averaging the unfolded phase estimates whereas the frequency offset is computed by averaging the differences between adjacent unfolded phase estimates.

Disclosed herein is an apparatus for joint phase offset and frequency offset estimation for MPSK transmission, comprising a complex multiplier, an accumulator, a phase calculator, an unfolding section, and phase and frequency estimators. The complex multiplier multiplies a received signal by a complex conjugate of a preamble, and the outputs of the complex multiplier are accumulated in the accumulator for a divided observing interval of length MT. The phase calculator calculates phases of outputs from the accumulator to obtain an integer number (N) of phases. The unfolding section unfolds the N phases so that the values between adjacent phase estimates are continuous. The phase offset estimator estimates phase offset based on the average value of the N unfolded phases, and the frequency offset estimator estimates frequency offset based on the average value of the N−1 differences between adjacent phase estimates.

BRIEF DESCRIPTION OF THE DRAWINGS

The above objects and other characteristics and advantages of the present invention will become more apparent by describing in detail a preferred embodiment thereof with reference to the attached drawings, in which.

DETAILED DESCRIPTION OF THE INVENTION

Hereinafter, a method and an apparatus for joint phase offset and frequency offset estimator for an MPSK transmission according to the preferred embodiment of the present invention will be explained in more detail with reference to the accompanying drawings.

An apparatus for joint phase offset and frequency offset estimator for an MPSK transmission will be explained with reference to FIGS. 1, 2, 4, 5, and 6.

Figure 1:
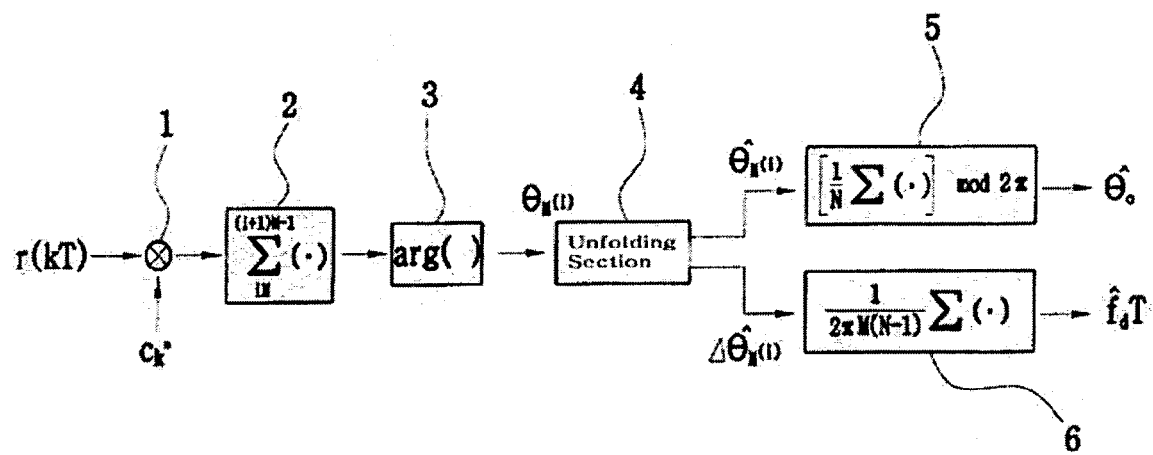
FIG. 1 is a block diagram showing a configuration of an apparatus for a joint phase and frequency offsets estimator for an MPSK transmission according to the preferred embodiment of the present invention.

FIG. 1 is a block diagram showing a configuration of an apparatus for a joint phase and frequency offsets estimator for an MPSK transmission according to the preferred embodiment of the present invention.

The apparatus for a joint phase and frequency offsets estimator for an MPSK transmission simultaneously performs a phase offset estimator 5 and a frequency offset estimator 6 by modifying a conventional maximum likelihood phase offset estimator. As a result, the present invention generates a smaller delay in comparison with a conventional method which sequentially estimates a frequency offset and a phase offset. Since the present invention shares a plurality of hardware parts, it lowers a structural complexity.

The apparatus includes a complex multiplier 1, an accumulator 2, a phase calculator 3, an unfolding section 4, a phase offset estimator 5, and a frequency offset estimator 6.

The complex multiplier 1 multiplies a received signal r(kT) by a complex conjugate of a preamble, $c_k^*$. The accumulator 2 accumulates a plurality of outputs of the complex multiplier 1 for a divided observing interval of a length MT. The phase calculator 3 calculates phases of the outputs from the accumulator 2 to obtain N phases. Where, N is an integer. The unfolding section 4 continues the N phases obtained by the phase calculator 3 to have continuous values between adjacent phase estimates by using an algorithm of a flow chart of an unfolding block shown in FIG. 6.

The phase offset estimator 5 calculates an average value of the N unfolding phases from the unfolding section 4, estimates a phase offset by performing the function of (x mode $2\pi$) to the result of average. The frequency offset estimator 6 calculates an average value of a difference of (N-1) adjacent unfolded phase estimates from the unfolding section 4. The frequency offset estimator 6 divides the average value of (N-1) unfolded phase differences by $2\pi M$ in order to estimate a frequency offset.

In other words, the present invention estimates a phase offset and a lo frequency offset based on a phase offset in a divided observing interval.

In an embodiment of the present invention, it is assumed that a symbol timing is ideal, a normalized frequency offset is significantly less than 1 (that is, $f_d T \ll 1$), and the received symbol sequence is a known sequence.

Accordingly, the k-th received signal to the complex multiplier 1 is given by:

$$r(kT) = c_k e^{j(2\pi k f_d T + \theta_0)} + n(kT) \qquad (1)$$

where $c_k$ is an MPSK signal received in a k-th symbol interval, it is normalized that $|c_k|^2 = 1$, $\theta_0$ is a phase offset, $f_d$ is a small frequency offset, T is a symbol period, n(kT) is an additive white complex Gaussian noise, whose real and imaginary components are independent and identically distributed Gaussian random variables with zero mean and variance of $$\frac{N_0}{2E_s},$$

respectively. Signal components and noise components are statistically independent.

Figure 2:
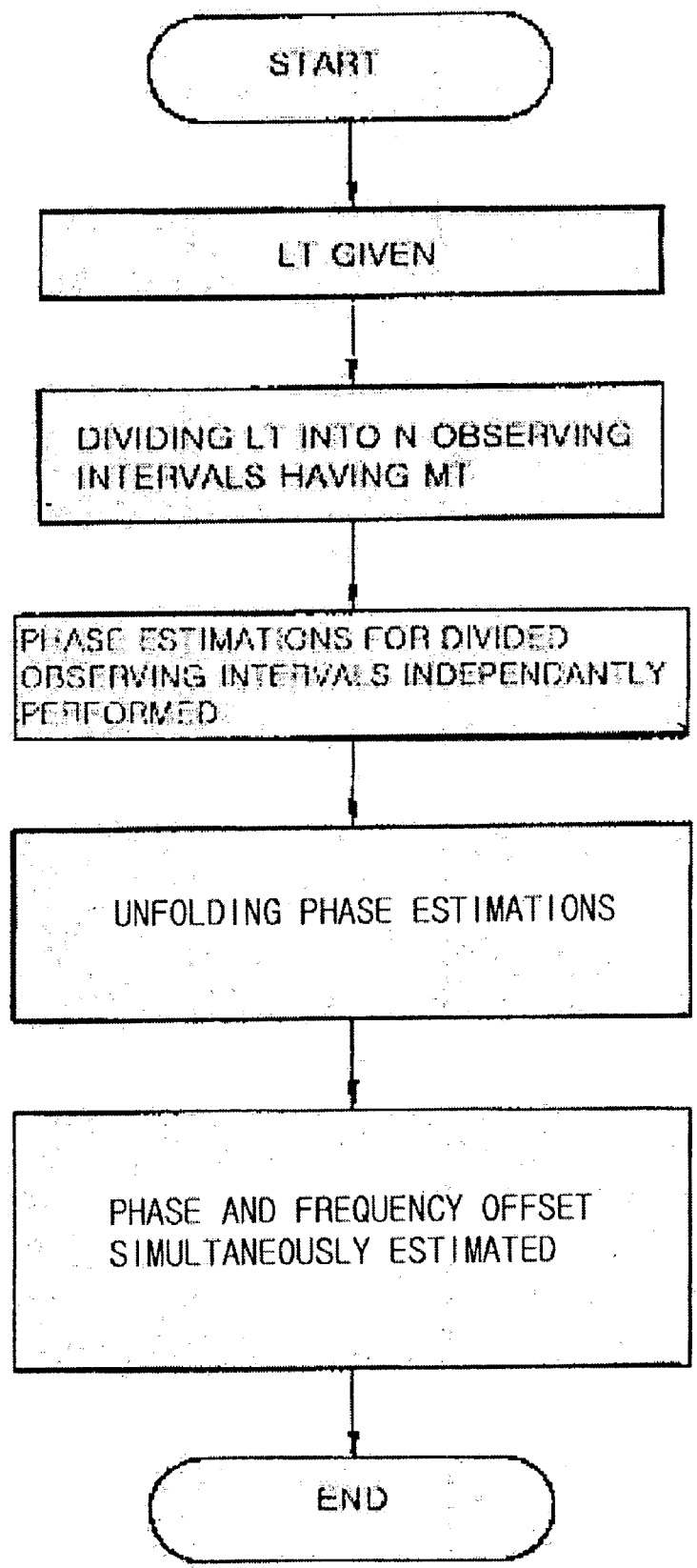
FIG. 2 is a flow chart for illustrating a method for a joint phase and frequency offsets estimator for an MPSK transmission according to the preferred embodiment of the present invention.

As shown in FIG. 2, it is assumed that a total observing interval is LT. The total observing interval LT is divided into N observing intervals each having a length MT. A phase estimation for each divided observing interval is performed independently.

Figure 3:
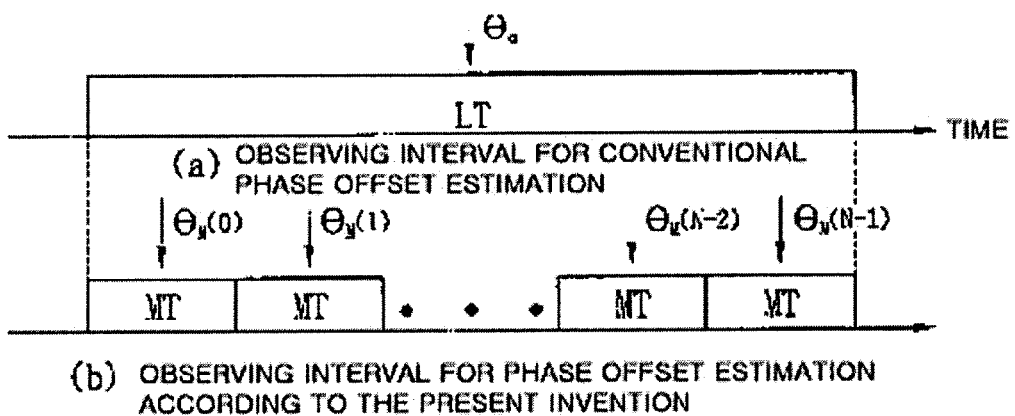
FIG. 3 is a view for showing a result which compares an observing interval for a phase offset estimation according to the present invention with a conventional observing interval for a phase offset estimation.

A method for a joint phase and frequency offsets estimator for an MPSK transmission according to the preferred embodiment of the present invention will be described with reference to FIGS. 2 and 3. FIG. 2 shows a flow chart for illustrating a method for a joint phase and frequency offsets estimator for an MPSK transmission according to the preferred embodiment of the present invention. FIG. 3 is a view for comparing an observing interval for a phase offset estimation according to the present invention with a conventional observing interval for a phase offset estimation.

A total observing interval LT is given. The total observing interval LT is divided into N observing intervals each having a predetermined length MT. Where, N is an integer. A plurality of phase estimations for the divided N observing intervals are independently performed to obtain phase estimates.

The phase estimates is unfolded to have continuous phase between adjacent estimates. A phase offset and a frequency offset are simultaneously estimated by averaging the unfolded phase estimates and by averaging the differences between adjacent unfolded phase estimates, respectively.

FIG. 3(a) shows an observing interval for a conventional phase offset estimation. But FIG. 3(b) shows the method of dividing the observation interval for the phase and frequency offset estimation according to the present invention, i.e., the overall observing interval LT is divided into N observing intervals not to be overlapped with one another. The N divided observing intervals have the same length, namely, MT. A phase estimation is performed independently on each observing interval. The i-th phase estimate is indicated as $\theta_M(i)$, where, i ranges from 0 to (N-1).

Figure 4:
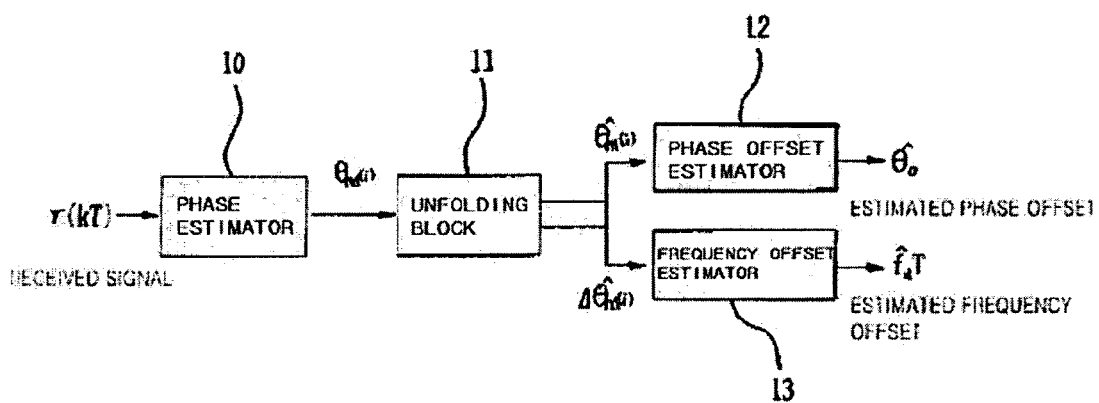
FIG. 4 is a block diagram illustrating a function of the apparatus shown in FIG. 1.

FIG. 4 is a block diagram illustrating a function of the apparatus shown in FIG.1. A phase estimator block 10 independently performs a plurality of phase estimations for the divided N observing intervals to obtain a plurality of phase estimates. The estimate of the i-th divided observing interval is indicated as $\theta_M(i)$. Reference numeral 11 represents an unfolding block. Detail operation of the unfolding block 11 is described in FIG. 6. Reference numeral 12 represents a phase offset estimator block. Reference numeral 13 represents a frequency offset estimator block.

A phase estimation for an i-th observing interval is expressed as:

$$\theta_M(i) = \arg\left\{\sum_{k=iM}^{(i+1)M-1} c_k^* r(kT)\right\} \qquad (2)$$

wherein c* is a conjugate complex of c, arg(x) is a function which calculates a phase of a complex value of "x" and has the resultant value in the range of $[-\pi, \pi]$.

Figure 5:
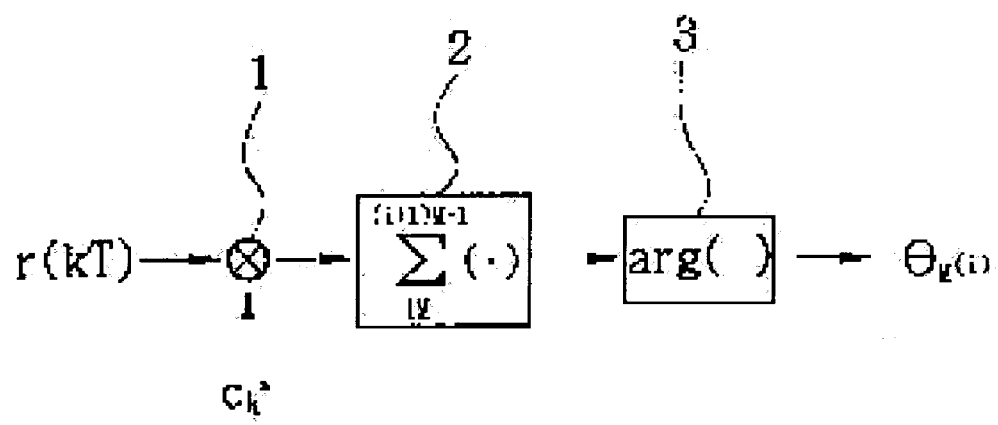
FIG. 5 is a block diagram illustrating a function of a phase estimator block shown in FIG. 4.

FIG. 5 is a detail block diagram illustrating a function of a phase estimator shown in FIG. 4. As shown in FIG. 5, a complex multiplier 1, an accumulator 2, and a phase calculator 3 sequentially calculate each part of the equation (2). In other words, the complex multiplier 1 multiplies a received signal by a complex conjugate of a k-th known transmission signal. The accumulator 2 accumulates the resultant values of multiplications from the complex multiplier 1 for MT time period, namely, calculates $$\left\{ \sum_{k=iM}^{(i+1)M-1} c_k^* r(kT) \right\}.$$

The phase calculator 3 calculates phases of the output from the accumulator 2 to obtain phase estimate, namely, calculates arg $$\left\{ \sum_{k=iM}^{(i+1)M-1} c_k^* r(kT) \right\}.$$

The accumulator 2 is initialized to a complex value of (0+j0) at the beginning of each accumulation for the i-th divided observation interval. After accumulating complex multiplication results for MT time period and performing arg( ) calculation to obtain one phase estimate. These procedures are repeated until N phase estimates are computed.

Returning now to FIG. 4, a phase $\theta_M(i)$ estimated by the phase estimator block 10 is limited to an estimate of $[-\pi, \pi)$ All by the arg( ) calculation. In a continued estimation, when an i-th estimate phase is in close proximity to $\pm\pi$, a difference $\Delta\theta_M(i)$ between an i-th and an (i−1)-th phase estimates is really very small, but becomes about $\pm 2\pi$. It causes a great error to be occurred in a phase offset estimation and a frequency offset estimation.

In order to prevent the occurrence of a great error, a current estimate phase calculated in a current observing interval should have a continuous value based on a previously calculated phase estimate in a just before divided observing interval. The unfolding block 11 performs such a function. The i-th output of the unfolding block 11 is indicated as $\Delta\hat{\theta}_M(i)$.

A difference between an i-th and an (i−1)-th estimate phases is calculated by the following equation (3):

$$\Delta\theta_M(i) \equiv \theta_M(i) - \theta_M(i-1) \tag{3}$$

wherein an initial value of $\theta_M(i)$ is $\theta_M(-1)$ and the $\theta_M(-1)$ is initialized to zero.

That is, $$\theta_M(-1) = 0 \tag{4}$$

in order to have a continuous phase estimate of a continuous value in close proximity to $-\pi$ or $\pi$, an estimated phase difference is compensated as the following equation (5):

$$\Delta\hat{\theta}_M(i) = \begin{cases} \Delta\theta_M(i) & \text{for } |\Delta\theta_M(i)| < \pi \\ \Delta\theta_M(i) - 2\pi\mathrm{sgn}(\Delta\theta_M(i)), & \text{otherwise} \end{cases} \tag{5}$$

$$\text{wherein sgn}(x) = \begin{cases} 1, & \text{for } x \geq 0 \\ -1, & \text{for } x < 0 \end{cases} \tag{6}$$

An unfolded phase in an (i−1)-th observing interval $\hat{\theta}_M(i-1)$ is added to the i-th compensated phase estimate difference $\Delta\hat{\theta}_M(i)$ to obtain an unfolded phase in an i-th observing interval. The unfolded phase in an i-th observing interval $\hat{\theta}_M(i)$ is indicated as the following equation:

$$\hat{\theta}_M(i) = \hat{\theta}_M(i-1) + \Delta\hat{\theta}_M(i) \tag{7}$$

wherein an initial value $\hat{\theta}_M(-1)$ of the continued phase $\Delta\hat{\theta}_M(i)$ is initialized to zero.

Figure 6:
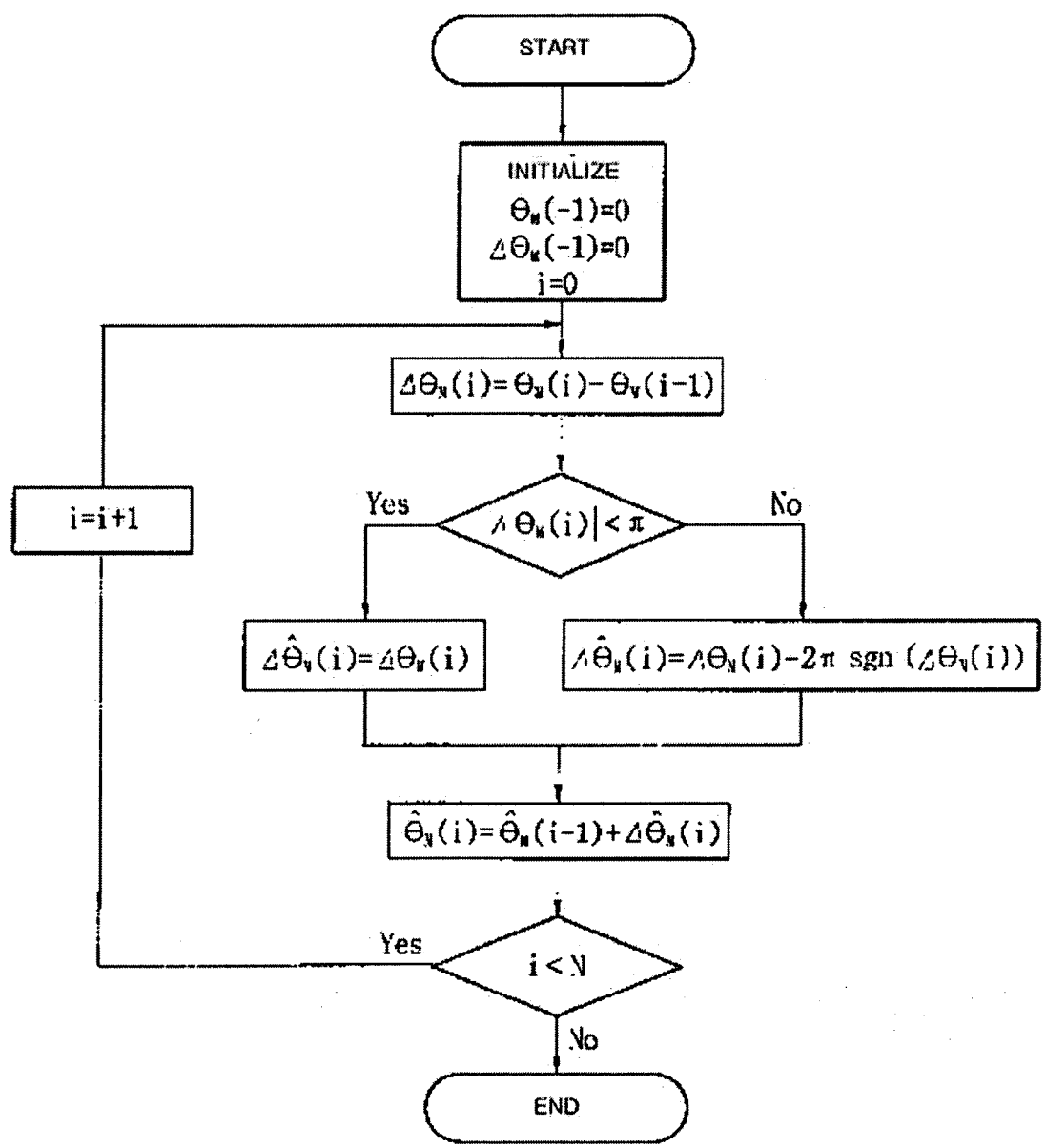
FIG. 6 is a flow chart for illustrating an algorithm of an unfolding block shown in FIG. 4.

That is, $$\hat{\theta}_M(-1) = 0 \tag{8}$$

an output of the unfolding block 11 has the i-th continued phase $\hat{\theta}_M(i)$ and a compensated phase estimate difference $\Delta\hat{\theta}_M(i)$ calculated in a calculation procedure to obtain the i-th continued phase $\hat{\theta}_M(i)$ FIG. 6 is a flow chart for illustrating an algorithm of an unfolding block shown in FIG. 4. The phase offset estimator block 12 calculates an average value of the plurality of unfolded estimate phase estimates to obtain a phase offset estimate. The phase offset estimate is computed as the following equation (9):

$$\hat{\theta}_0 = \left\{ \frac{1}{N} \sum_{i=0}^{N-1} \hat{\theta}_M(i) \right\} \bmod 2\pi \tag{9}$$

wherein y=x mod $2\pi$ performs addition or subtraction an integer multiple of $2\pi$ to or from 'x' to obtain 'y' within a value region $[-\pi,\pi)$.

A frequency offset estimator block 13 shown in FIG. 4 calculates an estimated frequency offset $\hat{f}_d T$ using a continued phase estimate difference by the following equation (10).

$$\hat{f}_d T = \frac{1}{2\pi M(N-1)} \sum_{i=1}^{N-1} \hat{\theta}_M(i) \tag{10}$$

When L and M satisfy the equation (11) at a high signal-to-noise, a frequency offset estimation having a minimal variance is implemented, $$L = \frac{M_o 2 M_o^2 \pi f_d T \tan^{-1}(M_o \pi f_d T)}{2 M_o \pi \tan^{-1}(M_o \pi f_d T) - 1} \tag{11}$$

wherein $M_0$ is an optimal value M and has a lower subscript "0". Since $\tan^{-1}(x)$ is approximated that $\tan^{-1}(x) \approx x^{-1}$ for small x, the equation (11) is simplified to the following equation (12):

$$M_{app} = \frac{L}{3} \tag{12}$$

wherein since M is an integer and is a factor of L, M is selected as a value most approximate to $$\frac{L}{3}$$

among the factors of L.

The present invention modifies the conventional phase estimating scheme required to a coherent transmission to estimate frequency offset as well as phase offset, so that an additionally necessary calculation is minimized. Also, according to the present invention, the apparatus for joint phase offset and frequency offset estimator for an MPSK transmission is used for fine frequency offset estimator and phase offset estimator as main parts of a digital receiver.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A method for joint phase offset and frequency offset estimator for a multiple phase shift keying transmission, the method comprising the steps of:
   (i) dividing an overall observing interval LT into N observing intervals each having a predetermined length MT where N and M are an integer;
   (ii) independently performing phase estimations for the divided N observing intervals to obtain a plurality of phase estimates;
   (iii) unfolding the plurality of phase estimates obtained in step (ii) to have continuous values between adjacent phase estimates, wherein the step (iii) includes the substeps of:
   initializing $\theta_M(-1)$ to zero;
   initializing $\Delta\theta_M(-1)$ to zero;
   calculating a difference between the i-th estimate phase and the (i −1)-th estimate phase by the following equation: $\Delta\theta_M(i) \equiv \theta_M(i) - \theta_M(i-1)$;
   compensating for the phase difference according to $|\Delta\theta_M(i)|$ by the following equation:

$$\Delta\hat{\theta}_M(i) = \begin{cases} \Delta\theta_M(i), & \text{for } |\Delta\theta_M(i)| < \pi \\ \Delta\theta_M(i) - 2\pi\text{sgn}(\Delta\theta_M(i)), & \text{otherwise} \end{cases} ; \text{and}$$

adding an unfolded phase in an (i −1)-th observing interval to the i-th compensated phase difference to obtain an unfolded phase $\hat{\theta}_M(i)$ in an i-th observing interval which is indicated as the following equation: $\hat{\theta}_M(i) = \hat{\theta}_M(i-1) + \Delta\hat{\theta}_M(i)$; and
   (iv) simultaneously estimating a phase offset and a frequency offset by averaging the unfolded phase estimates and by averaging the phase differences between adjacent unfolded phase estimates, respectively.

2. The method according to claim 1, wherein the step (ii) includes the substeps of;
   dividing the total observing interval LT divided into N observing intervals to have the same length MT not to be overlapped with one another; and
   independently performing a phase estimation for the i-th observing interval using a following equation:

$$\theta_M(i) = \arg\left\{\sum_{k=iM}^{(i+1)M-1} c_k^* r(kT)\right\},$$

where N is an integer, T is a symbol period, c* is a complex conjugate of c, arg(x) is a function which calculates a phase of a complex value of "x" and has a resultant value of $[-\pi, \pi)$.

3. The method according to claim 1, wherein the estimation of a phase offset of step (iv) calculates an average value of unfolded phase estimates to obtain a phase offset estimate which is indicated as the following equation:

$$\hat{\theta}_0 = \left\{\frac{1}{N}\sum_{i=0}^{N-1}\hat{\theta}_M(i)\right\}\text{mod}2\pi,$$

where y=x mod $2\pi$ and is a value within $[-\pi, \pi)$ by adding or subtracting an integer multiple of $2\pi$ to or from x.

4. The method according to claim 1, wherein the estimation of a frequency offset of step (iv) calculates a frequency offset $\hat{f}_d T$ using the phase differences between adjacent unfolded phase estimates by the following equation:

$$\hat{f}_d T = \frac{1}{2\pi M(N-1)}\sum_{i=1}^{N-1}\hat{\theta}_M(i).$$

5. The method according to claim 1 or 2, wherein the method uses a complex multiplier for multiplying a received signal by a complex conjugate of a k-th transmission signal; an accumulator being initialized to a complex value of (0+j0) at a beginning of the divided observing terminal and for accumulating the resultant values of complex multiplications of the complex multiplier for MT time period; and an arg( ) calculator, which operates once per a divided observing interval, for calculating phase of complex output from the accumulator.

6. The method according to claim 1 or 2, wherein an optimal value of M, represented as $M_0$, is calculated as the equation:

$$L = \frac{M_o + 2M_0^2\pi f_d T \tan^{-1}(M_0\pi f_d T)}{2M_o\pi\tan^{-1}(M_0\pi f_d T) - 1},$$

it is determined that $M = M_0$ when $M_0$ is an integer and a factor of L, and otherwise, M is determined as a value closest to $M_0$ in the factors of L.

7. The method according to claim 1 or 2, wherein a simplified optimal observing interval $M_{app}$ is calculated as the following equation:

$$M_{app} = \frac{L}{3},$$

it is determined that $M = M_{app}$ when $M_{app}$ is an integer and a factor of L, and otherwise, M is determined as a value closest to $M_{app}$ in the factors of L.

8. An apparatus for joint phase offset and frequency offset estimator for a multiple phase shift keying transmission, the apparatus comprising:

a complex multiplier for multiplying a received signal by a complex conjugate of a known symbol;

an accumulator for accumulating a plurality of outputs of the complex multiplier for a divided observing interval of a length MT;

a phase calculator for calculating phases of the plurality of outputs from the accumulator to obtain N phases;

an unfolding section for continuing the N consecutive phases obtained by the phase calculator to have continuous values;

a phase offset estimator for calculating an average value of the N unfolded phases from the unfolding section, and estimating a phase by (mod $2\pi$) operation in the average of the N unfolded phases; and a frequency offset estimator for calculating an average value of (N−1) phase differences between adjacent unfolded phase estimates from the unfolding section, and dividing the average value of (N−1) phase differences by $2\pi M$ in order to estimate a frequency offset;

wherein the unfolding section includes phase estimates, as input, independent of frequency estimates for the purpose of continuing the N consecutive phases obtained by the phase calculator to have continuous values.

9. The apparatus according to claim 8, wherein the phase offset estimator unfolds a phase estimate for each divided observing interval to have continuous values, calculates an average value of the unfolded phase estimates and estimates a phase by (mod $2\pi$) operation in the average of the N unfolded phases.

10. The apparatus according to claim 8, wherein the frequency offset estimator unfolds phase estimates for each divided observing interval to have continuous values, calculates an average value of the phase differences between adjacent phase estimates, and divides the average value of the phase differences between adjacent unfolded phase estimates by $2\pi M$ in order to estimate a frequency offset.

* * * * *